(12) United States Patent
Oetlinger et al.

(10) Patent No.: US 6,648,318 B1
(45) Date of Patent: Nov. 18, 2003

(54) WELDING JIG

(75) Inventors: Frank F. Oetlinger, Grafton, WI (US); Russell Kempka, Jr., Milwaukee, WI (US)

(73) Assignee: Oetlinger Tool Engineering Co., Inc., Grafton, WI (US)

( * ) Notice: Subject to any disclaimer, the term of this patent is extended or adjusted under 35 U.S.C. 154(b) by 0 days.

(21) Appl. No.: 10/164,930

(22) Filed: Jun. 6, 2002

(51) Int. Cl.[7] .................................................. B25B 1/20
(52) U.S. Cl. ............................. 269/41; 269/43; 269/71
(58) Field of Search ..................... 269/41–45, 71–73, 269/907

(56) References Cited

U.S. PATENT DOCUMENTS

| | | | | |
|---|---|---|---|---|
| 979,305 A | * | 12/1910 | Hunt | 269/44 |
| 1,084,130 A | * | 1/1914 | Cargin | 269/45 |
| 2,669,958 A | * | 2/1954 | Sweeney | 269/41 |
| 4,500,077 A | * | 2/1985 | Coxon | 269/45 |
| 6,318,712 B1 | * | 11/2001 | Coffman | 269/41 |
| 6,391,144 B1 | * | 5/2002 | Gilbert, Jr. | 269/41 |

\* cited by examiner

*Primary Examiner*—Lee D. Wilson
(74) *Attorney, Agent, or Firm*—Boyle Fredrickson Newholm Stein & Gratz S.C.

(57) ABSTRACT

A welding jig is provided for supporting and aligning first and second workpieces in preparation for a welding operation. The welding jig includes a first support arm extending along a first axis. A second support arm is operatively connected to the first support arm and extends along a second axis generally perpendicular to the first axis. A first clamping member is operatively connected to the first end of the first support arm for supporting a first workpiece. A second clamping member is pivotably connected to the first end of the second support arm for supporting a second workpiece. The second clamping member may be pivoted about a vertical axis for adjusting the angle between the first and second workpieces. In addition, the axial position of the second workpiece may be adjusted by moving the second clamping member along an axis parallel to the first workpiece.

10 Claims, 4 Drawing Sheets

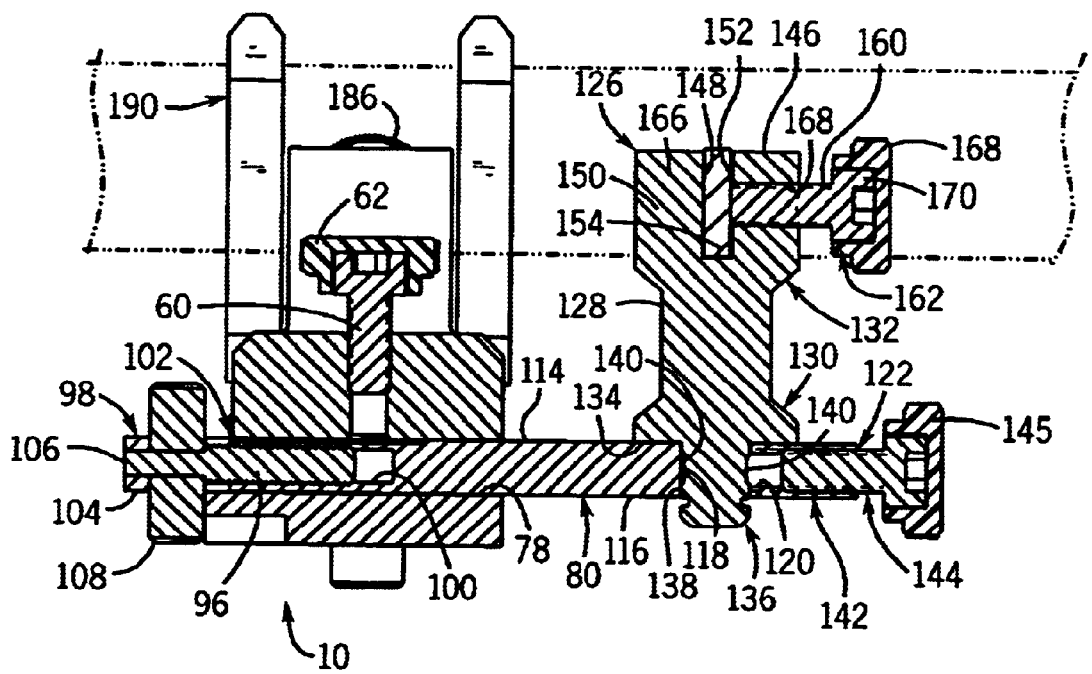
FIG. 8
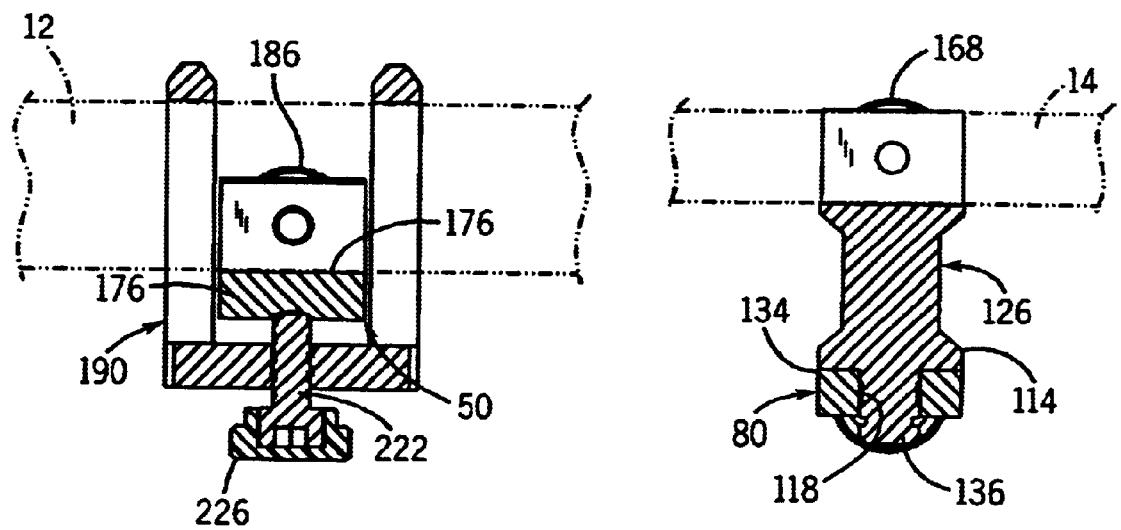
FIG. 9
FIG. 10

WELDING JIG

FIELD OF THE INVENTION

The present invention relates generally to welding equipment, and in particular, to a welding jig for positioning first and second workpieces adjacent one another to facilitate the welding of the same.

BACKGROUND AND SUMMARY OF THE INVENTION

The welding industry is extremely competitive. As such, it is vital that a minimum amount of manpower and time be used to effectuate a welding operation while still assuring that a high quality weld is achieved. This is often a difficult task in such instances where multiple workpieces must be welded together to form a customized arrangement. The workpieces in these customized arrangements are not necessarily at standard right angles to each other. As a result, an assistant coupled with various jerry-built holders may be required to position the workpieces with respect to one another while the workpieces are initially tacked in place and welded together. It can be appreciated that the alignment of the workpieces with respect to one another is often a difficult undertaking. In addition, by way of example, conditions such as poor lighting, awkward positions, and the like may complicate the welding process. Further, depending on the quality of the jerry-built holder, errors in the welding process may necessitate the redoing of a complicated welding project.

Several jigs have been developed to assist in the aligning and holding of workpieces relative to each other. However, many of these jigs are more complicated and expensive than is desired. Further, known welding jigs are often cumbersome to use and are not as durable and long lasting as is desired. Further, with prior jigs, it is often necessary to reconfigure the jigs each time a new welding operation takes place. As heretofore described, this reconfiguration may be a difficult undertaking. In addition, most welding jigs only allow for the positioning of two workpieces at right angles to each other and do not accommodate the positioning of the workpieces at a variety of angles to each other. Therefore, it is highly desired to provide a welding jig that allows for the quick and easy positioning of workpieces at various angles to each other, without the need to completely reconstruct the welding jig.

Therefore, it is a primary object and feature of the present invention to provide a welding jig that is simple to utilize and inexpensive to manufacture.

It is a further object and feature of the present invention to provide a welding jig that easily positions first and second workpieces adjacent one another for a welding operation.

It is a still further object and feature of the present invention to provide a welding jig that allows a user to position first and second workpieces adjacent one another at a user desired angle to each other.

In accordance with the present invention, a welding jig is provided for positioning first and second workpieces adjacent to one another. Each workpiece has first and second sides and first and second ends. The welding jig includes a first clamp structure for supporting the first workpiece and a second clamp structure operatively connected to the first clamp structure. The second clamp structure supports the second workpiece at a user desired location such that the first end of the second workpiece abuts the first side of the first workpiece.

The first clamp structure includes a clamp movable between an open position wherein the first workpiece is vertically movable and a clamping position wherein the first workpiece is retained in a user desired position. The first clamp structure may also include a clamp movable between an open position wherein the clamp is spaced from the second side of the first workpiece and a clamping position wherein the clamp engages the second side of the first workpiece to retain the first workpiece in a user desired position.

An adjustment mechanism is operatively connected to the second clamp structure. The adjustment mechanism allows the user to reposition the second workpiece along the first side of the first workpiece. The adjustment mechanism includes a locking structure for retaining the second clamp structure in a selected position. It is contemplated to provide a support structure for supporting the first and second clamp structures. The second clamp structure is pivotably mounted to the support structure and a locking structure is provided for retaining the second clamp structure is a selected position.

In accordance with a further aspect of the present invention, a welding jig is provided. The welding jig includes a first support arm extending along the first axis. The first support arm has first and second opposite ends. A second support arm is operatively connected to the first support arm and extends along a second axis generally perpendicular to the first axis. The second support arm has first and second opposite ends. The first clamping member is operatively connected to the first end of the first support member for supporting a first workpiece. Second clamping members pivotably connected to the second end of the second support arm supporting a second workpiece. The second clamping member is pivotable about a vertical axis for positioning the second workpiece relative to the first workpiece.

The welding jig may also include an adjustment mechanism engagageable with the second support arm. The adjustment mechanism moves the first end of the second support arm toward and away from the first support arm to a user desired position. A locking mechanism rigidly connects the first and second support arms in a user desired position.

The first clamping member includes a first clamping structure having first and second clamping elements defining a first cavity therebetween. First and second clamping elements are adjustable between a first open position for allowing the workpiece be inserted to and removed from the first cavity and a clamping position for retaining the first workpiece in the first cavity. The first clamping member also includes a second clamping structure having first and second clamping elements defining in a second cavity therebetween. First and second clamping elements of the second clamping structure are adjustable between a first open position for allowing the first workpiece to be inserted to and removed from the second cavity and a clamping position for retaining the second workpiece in the second cavity. Similarly, the second clamping member includes a clamp defining a second workpiece receiving cavity therein. The clamp is movable between an open position for allowing the second workpiece to be inserted to and removed from the second workpiece receiving cavity and a clamping position for retaining the second workpiece in the second workpiece receiving cavity.

In accordance with a still further aspect of the present invention, a welding jig is provided. The welding jig includes a first support arm extending along an axis and having a passageway therein. A second support arm is slidable received in the passageway of the first support arm. A first clamping member is operatively connected to the first support arm for supporting a first workpiece and a second clamping member is operatively connected to the second support arm for supporting a second workpiece. An arm locking structure extends into the passageway of the first support arm for maintaining the second support arm at a user selected position with respect to the first support arm.

The second clamping member is pivotable upon an axis for positioning the second workpiece relative to the first workpiece. The welding jig may include a clamp lock operatively connected to the second support arm for maintaining the second clamping member at a user desired position. An adjustment mechanism engages the second support arm and moves the second support arm to the user desired position.

The first clamping member includes a first clamping structure having first and second clamping elements defining a first cavity therebetween. The first and second clamping elements are adjustable between a first open position for allowing the first workpiece to be inserted to and removed from the first cavity and a clamping position for retaining the first workpiece in the first cavity. The first clamping member also includes a second clamping structure including first and second clamping elements defining a second cavity therebetween. The first and second clamping elements of the second clamping structure are adjustable between a first open position for allowing the first workpiece to be inserted to and removed from the second cavity and a clamping position for retaining the first workpiece in the second cavity. Similarly, the second clamping member includes a clamp defining a second workpiece receiving cavity therein. The clamp is movable between an open position for allowing the second workpiece to be inserted to and removed from the second workpiece receiving cavity and a clamping position for retaining the second workpiece in the second workpiece receiving cavity.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 8 is a cross-sectional view of the welding jig of the present invention taken along line 8—8 of FIG. 3;

FIG. 9 is a cross-sectional view of the welding jig of the present invention taken along line 9—9 of FIG. 3; and FIG. 10 is a cross-sectional view of the welding jig of the present invention taken along line 10—10 of FIG. 3.

DETAILED DESCRIPTION OF THE INVENTION

Figure 1:
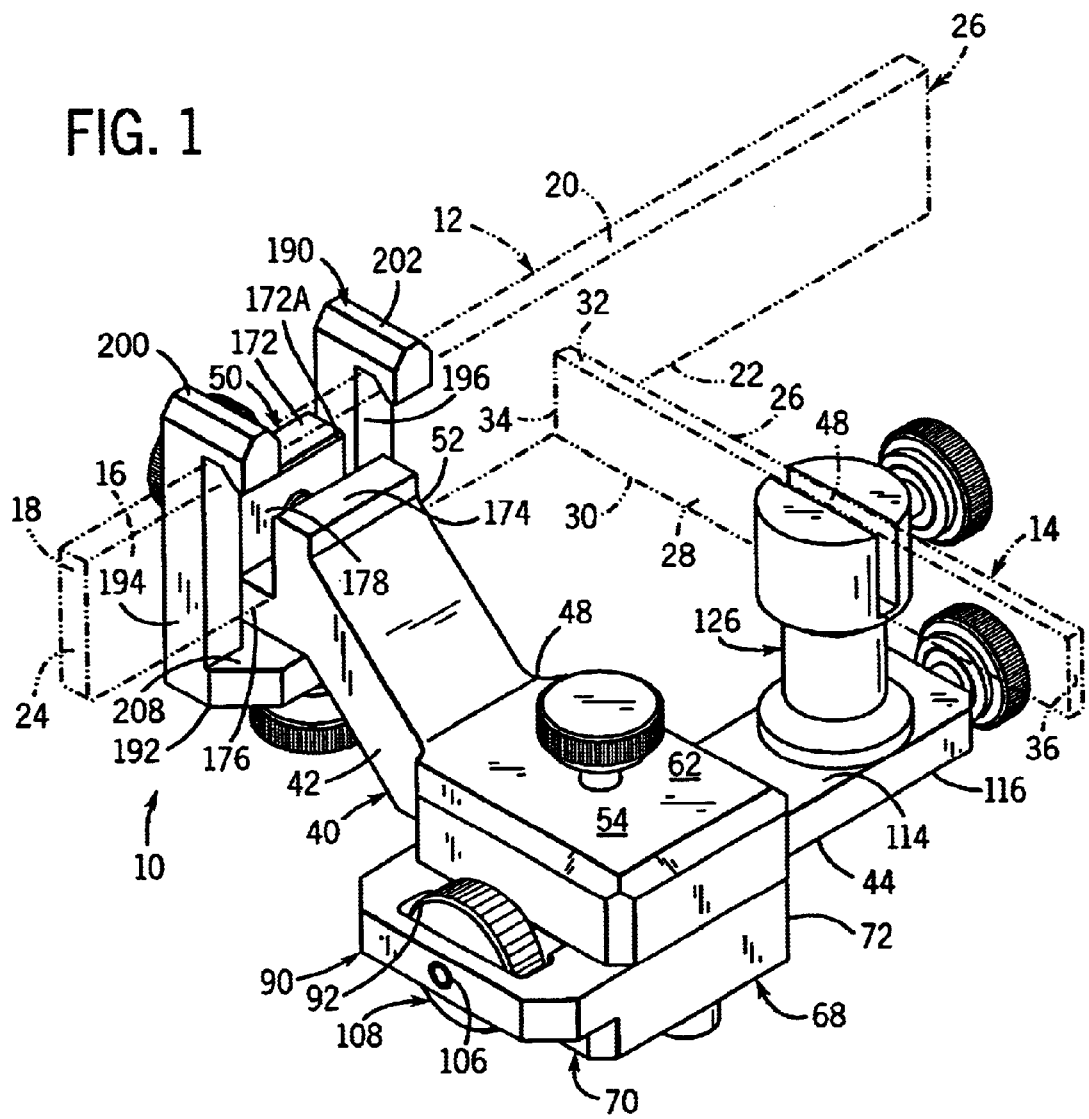
FIG. 1 is an isometric view of a welding jig in accordance with the present invention.
Figure 2:
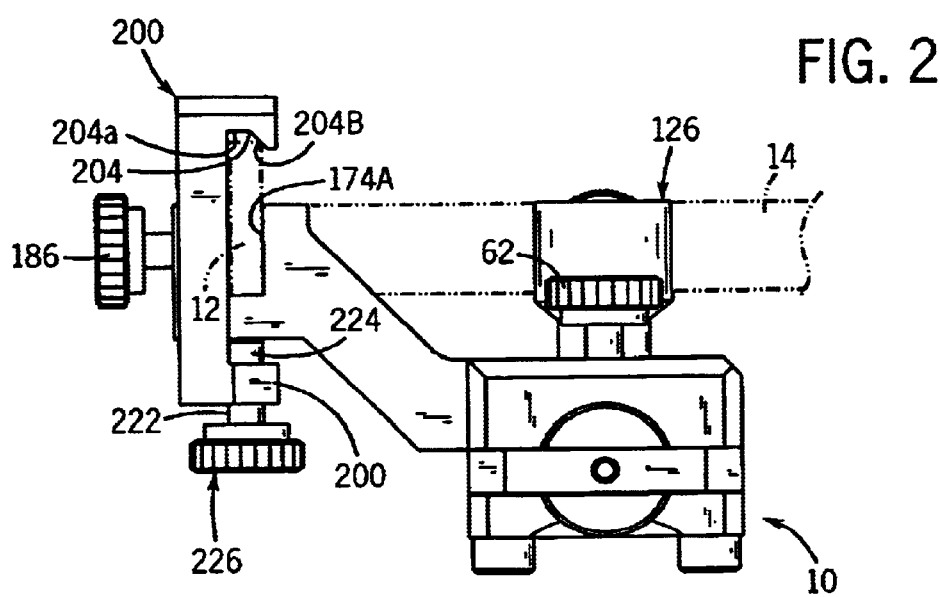
FIG. 2 is a side elevational view of a first side of the welding jig of FIG. 1.
Figures 3, 4:
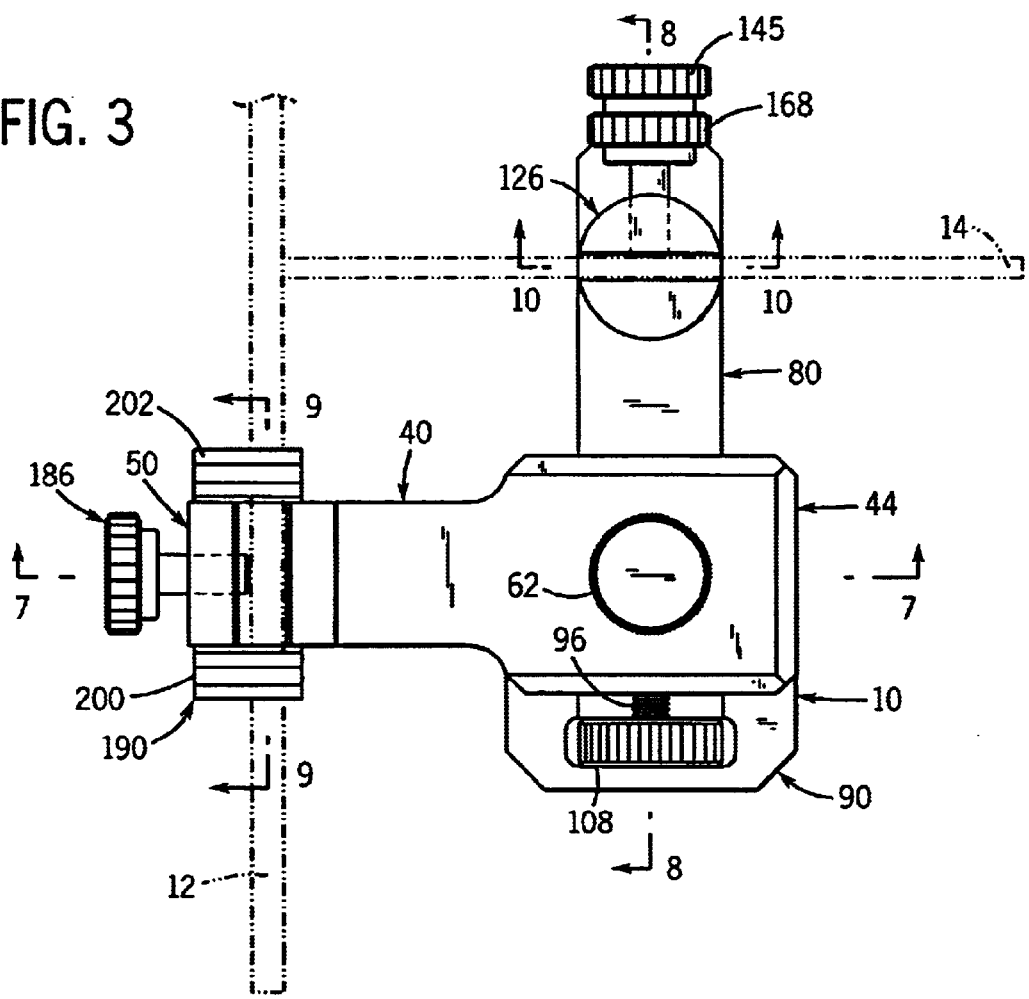
FIG. 3 is a top plan view of the welding jig of FIG. 1.
FIG. 4 is a front elevational view of the welding jig of FIG. 1.
Figure 5:
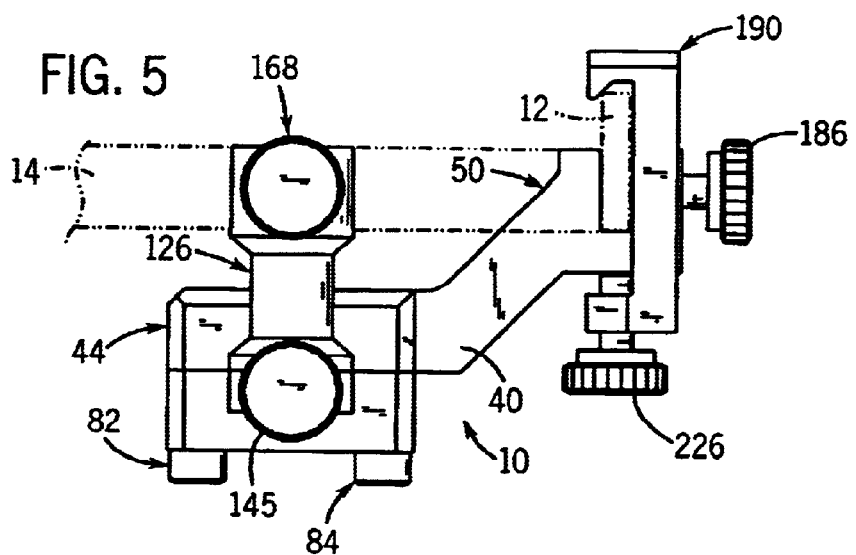
FIG. 5 is a side elevational view of a second side of the welding jig of FIG. 1.
Figure 6:
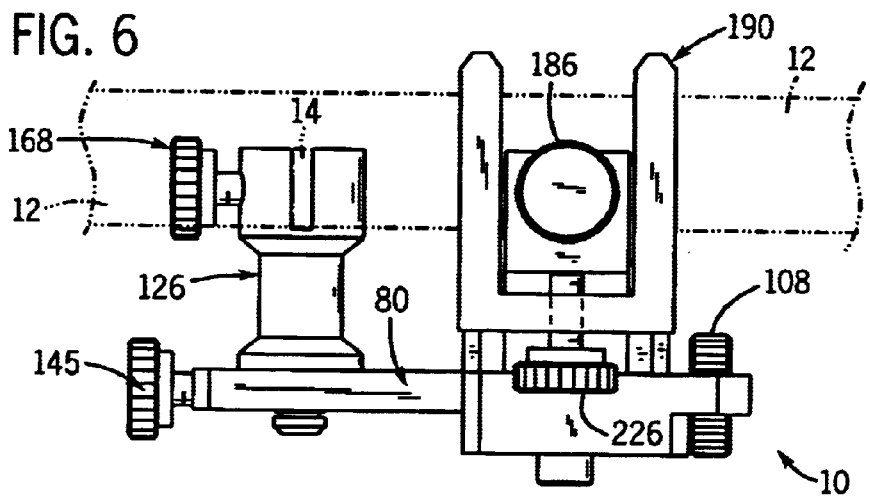
FIG. 6 is a rear elevational view of the welding jig of FIG. 1.

Referring to FIG. 1, a welding jig in accordance with the present invention is generally designated by the reference numeral 10. It is intended that welding jig 10 allow a user to position first and second workpieces 12 and 14, respectively, adjacent one another to facilitate the welding together of the same. By way of example, first and second workpieces 12 and 14, respectively, are depicted as elongated, generally flat plates. However, it is contemplated that welding jig 10 may be used to position workpieces of other configurations without deviating from the scope of the present invention.

By way of example, first workpiece 10 includes first and second sides 16 and 18, respectively; first and second edges 20 and 22, respectively; and first and second ends 24 and 26, respectively. Similarly, second workpiece 14 includes first and second sides 26 and 28, respectively; first and second edges 30 and 32; and first and second ends 34 and 36, respectively. As hereinafter described, it is intended to position first end 34 of second workpiece 14 at a user desired location adjacent first side 16 of first workpiece 10 to facilitate a welding operation.

Figure 7:
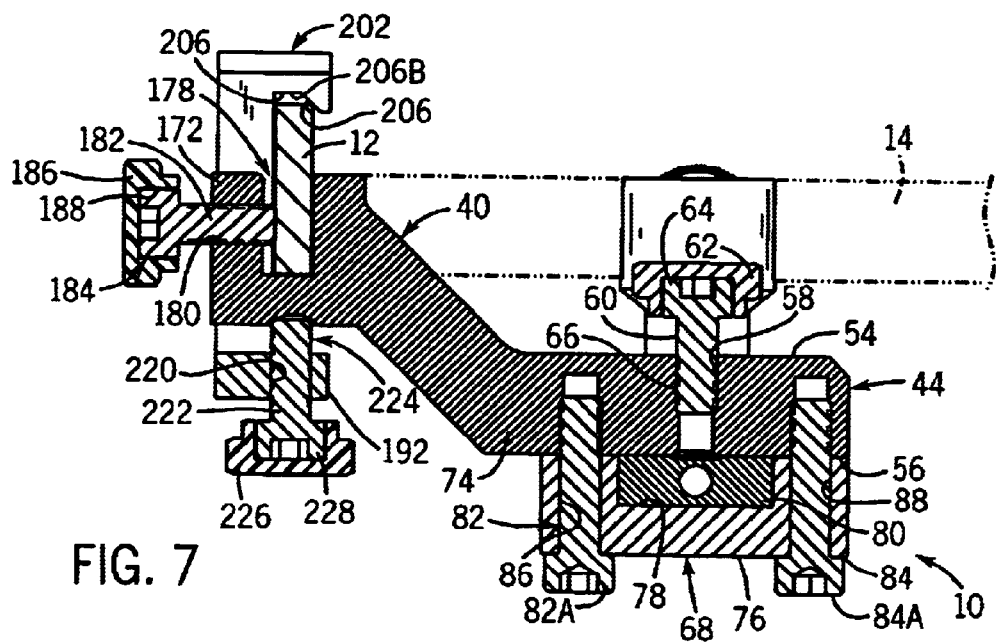
FIG. 7 is a cross-sectional view of a welding jig of the present invention taken along line 7—7 of FIG. 3.

Welding jig 10 includes a support generally designated by the reference numeral 40. Support 40 includes an arm 42 having enlarged support element 44 formed on first end 48 thereof and clamping structure 50 formed on second end 52 thereof. As best seen in FIGS. 7 and 8, support element 44 is generally rectangular in shape and includes upper and lower surfaces 54 and 56, respectively, and a threaded passageway 56 extending therebetween. Screw 60 is threaded into passageway 58 of support element 44 for reasons hereinafter described. Cap 62 is molded over head 64 of screw 60 to facilitate rotation of shaft 66 into and out of passageway 58 through support element 44 by a user.

Support block 68 is interconnected to lower surface 56 of support element 44. Support box 68 has first and second ends 70 and 72, respectively, and upper and lower surfaces 74 and 76, respectively. Upper surface 74 of support block 68 includes a recess 78 formed therein for slidably receiving support arm 80, for reasons hereinafter described. Bolts 82 and 84 extend through corresponding threaded passageways 86 and 88 in support block 68 and into support element 44 so as to capture support block 68 between heads 82a and 84a of bolts 82 and 84, respectively, and lower surface 56 of support element 44.

A generally U-shaped member 90 extends from first side 70 of support block 68 and defines a cavity 92, for reasons hereinafter described. Shaft 96 of screw 98 is threaded into a threaded passageway 100 extending into first end 102 of support arm 80. Non-threaded portion 104 of screw 98 is seated within aperture 106 extending through member 90 for rotational movement therein. In addition, dial 108 is positioned about and rigidly connected to non-threaded portion 104 of screw 98. Dial 108 is positioned within cavity 92 defined by U-shaped member 90. It can be appreciated that rotation of dial 108 is translated to screw 98 so as to allow a user to thread threaded portion 102 of screw 98 into and out of a threaded passageway 100 in first end 102 of support arm 100. As a result, it can be understood that rotation of dial 108 allows a user to manually adjust the position of support arm 88 along its longitudinal axis.

Support arm 80 includes, upper and lower surfaces 114 and 116, respectively, and aperture 118 extending therebetween. Support arm 80 further includes threaded bore 120 extending inwardly from second end 122 of support arm 80.

Threaded bore 120 in second end 122 of support arm 80 communicates with aperture 118 through support arm 80, for reasons hereinafter described.

A pivotable clamp assembly 126 is supported by support arm 80. Clamp assembly 126 includes a generally cylindrical body 128 extending along an axis and having lower and upper ends 130, and 132, respectively. Lower end 130 of clamp assembly 128 terminates at a generally flat lower surface 134 that is supported by and slidably engages upper surface 114 of support arm 80. Neck 136 depends from lower surface 134 of clamping assembly 128 and extends through aperture 118 in support arm 80. Neck 136 includes an outer surface 138 that forms a rotational interface with surface 140 that defines aperture 118 through support arm 80. Outer surface 138 of neck 136 of clamping assembly 126 includes a circumferentially extending recess 140 therein for receiving the terminal end 142 of set screw 144, as hereinafter described. It can be appreciated that, as described, clamping assembly 126 is rotatable about the longitudinal axis of body 128.

Upper end 132 of cylindrical body 128 terminates at a generally flat upper surface 146. Workpiece receiving recess 148 extends into upper surface 146 of cylindrical body 128 and is defined by first and second generally parallel sidewalls 150 and 152, respectively. Sidewalls 150 and 152 in upper surface 146 of cylindrical body 128 are spaced by horizontal, lower surface 154. It can be appreciated that workpiece receiving recess 148 in upper surface 146 of cylindrical body 28 must be of sufficient dimension to accommodate the positioning of second workpiece 14 therein. Shaft 160 of a clamping screw 162 extends through threaded bore 164 in cylindrical body 128 of clamping assembly 126. Bore 164 through cylindrical body 128 communicates with workpiece receiving recess 148 in upper surface 146 of cylindrical body 128 so as to allow terminal end 166 of clamping screw 162 to extend into workpiece receiving recess 148 in upper surface 146 of cylindrical body 128 in response to the clockwise rotation of clamping screw 162. Cap 168 is molded over head 170 of clamping screw 162 to facilitate the grasping and rotation of clamping screw 162 by a user.

As best seen in FIGS. 1 and 7, clamping structure 50 is generally U-shaped and is defined by first and second legs 172 and 174, respectively, and base 176. Inner surfaces 172a and 174a of legs 172 and 174, respectively, define a channel 178 for receiving first workpiece 12 therein. Threaded bore 180 extends through leg 172 of clamping structure 50 for receiving threaded shaft 182 of screw 184. Threaded bore 180 through leg 172 communicates with channel 178 for reasons hereinafter described. Screw 184 includes a cap 186 formed about the head 188 thereof to facilitate the rotation of threaded shaft 182 of screw 184 into and out of threaded bore 180 in leg 172 of clamping structure 50 by a user.

Welding jig 10 further includes a generally U-shaped vertical clamping structure 190 for retaining first workpiece 12 in channel 178 through clamping structure 50. Vertical clamp 190 includes a generally flat base 192 having first and second legs 194 and 196, respectively, projecting vertically therefrom. Legs 194 and 196 are spaced so as to accommodate clamping structure 50 therebetween. First and second retaining elements 200 and 202, respectively, project laterally from the terminal ends of legs 194 and 196 respectively such that lower surfaces 204 and 206 of retaining elements 200 and 202, respectively, overlap upper surface 208 of base 192 of vertical clamping structure 190. Lower surfaces 204 and 206 of retaining elements 200 and 202, respectively, include first portions 204a and 206a, respectively, that are generally parallel to upper surface 208 of base 192 of vertical clamp 90 and angled portions 204b and 206b, respectively, that diverge from legs 194 and 196, respectively of vertical clamp 190. Angled portions 204b and 206b of lower surfaces 204 and 206, respectively, prevent lateral movement of first workpiece 12 when received in channel 178 in clamping structure 50.

Base 192 of vertical clamping structure 190 includes a threaded aperture 220 extending therethrough for receiving the threaded shaft 222 of screw 224. Cap 226 is provided over head 228 of screw 224 to facilitate the rotation of threaded shaft 222 of screw 224 into and out of passageway 220 through base 192 of vertical clamping structure 190 for reasons hereinafter described.

In operation, first workpiece 12 is positioned in channel 178 through clamping structure 50 such that edge 22 of first workpice 12 rests on base 176. A user utilizes cap 186 to rotate screw 184 clockwise into threaded bore 180 such that the terminal end of screw 184 engages and bears against second side 18 of first workpiece 12. This action provides the clamping force necessary to retain first workpiece 12 in channel 178 between the terminal end of screw 184 and leg 174 of clamping structure 50.

After clamping first workpiece 12 within channel 178 of clamping structure 50, vertical clamping structure 190 is positioned about first workpiece 12 such that first and second retaining elements 200 and 202, respectively, overlap edge 20 of first workpiece 12 and such that base 192 of vertical clamping structure 190 is positioned below base 176 of clamping structure 50. Cap 226 is utilized to rotate screw 224 in a clockwise direction into passageway 220 through base 192 of vertical clamping structure 190 such that the terminal end of screw 224 engages and bears against base 176 of clamping structure 50. This action urges retaining elements 200 and 202 into engagement with edge 20 of first workpiece 12 and provides additional clamping force on first workpiece 12 to prevent vertical movement of first workpiece 12 within channel 178.

Second workpiece 14 is positioned in workpiece receiving recess 148 in upper surface 146 cylindrical body 128 such that edge 30 of second workpice 14 rests on lower surface 154 and such that first end 34 of second workpiece 14 engages first side 16 of first workpiece 12. A user utilizes cap 168 to rotate screw 170 clockwise into threaded bore 164 such that the terminal end of screw 170 engages and bears against second side 28 of second workpiece 14. This action provides the clamping force necessary to retain second workpiece 14 in workpiece receiving recess 148 between the terminal end of screw 170 and sidewall 150 of cylindrical body 128.

In order to adjust the angle between first and second workpieces 12 and 14, respectively, cylindrical body 128 is rotated about it longitudinal axis to a user desired position. A user utilizes cap 145 to rotate set screw 144 clockwise into bore 120 in second end 122 of support arm 80 such that the terminal end 142 of set screw 144 engages and bears against neck 136 within recess 140. This action provides the clamping force necessary to retain clamping assembly 126 at a user desired position wherein second workpiece 14 extends from first workpiece 12 at a user selected angle.

In order to adjust the axial position of first end 34 of second workpiece 14 along the first side 16 of first workpiece 12, a user rotates dial 108. By rotating dial 108 in a first direction, support arm 80 is drawn into recess 178 in support block 168 such that first end 34 of second workpiece 14 slides axially along first side 16 of first workpiece 12 towards clamping structure 50. Alternatively, by rotating dial 108 in a second, opposite direction, support arm 80 withdraws from recess 178 in support block 168 such that first end 34 of second workpiece 14 slides axially along first side 16 of first workpiece 12 away from clamping structure 50. When first end 34 of second workpiece 14 is located at a user desired position along first side 16 of first workpiece 12, cap 62 is utilized to rotate screw 60 clockwise into passageway 58 through support element 44 such that the terminal end of screw 60 engages and bears against upper surface of support arm 80. This action provides the clamping force necessary to retain support arm 80 and first end 34 of second workpiece 14 at the user desired position along first side 16 of first workpiece 12.

Various modes of carrying out the invention are contemplated as being within the scope of the following claims particularly pointing and distinctly claiming the subject matter which is regarded as the invention.

We claim:

1. A welding jig for supporting first and second workpieces, each workpiece having first and second sides and first and second ends, comprising:
    a first support arm extending along a first axis, the first support arm having first and second opposite ends;
    a second support arm operatively connected to the first support arm and extending along a second axis generally perpendicular to the first axis, the second support arm having first and second opposite ends;
    a first clamping member operatively connected to the first end of the first support arm for supporting the first workpiece along a third axis generally parallel to the second axis of the second support arm;
    a second clamping member pivotably connected to the first end of the second support arm for supporting a second workpiece, the second clamping member pivotable about a vertical axis for positioning the first end of the second workpiece adjacent to the first side of the first workpiece such that the second workpiece extends from the first side of the first workpiece at an user desired angle thereto; and
    a moveable adjustment mechanism engageable with the second support arm, wherein movement of the adjustment mechanism by an user is translated to the second support arm such that the first end of the second workpiece moves axially along the second axis of said second support arm toward and away from the first axis of said first support arm while maintaining the user desired angle between the first side of the first workpiece and the second workpiece extending therefrom.

2. The welding jig of claim 1 further comprising a locking mechanism for rigidly connecting the first and second support arms at the user desired position.

3. The welding jig of claim 1 wherein the first clamping member includes:
    a first clamping structure including first and second clamping elements defining a first cavity therebetween, the first and second clamping elements adjustable between a first open position for allowing the first workpiece to be insert to and removed from the first cavity and a clamping position for retaining the first workpiece in the first cavity.

4. The welding jig of claim 3 wherein the first clamping member includes:
    a second clamping structure including first and second clamping elements defining a second cavity therebetween, the first and second clamping elements of the second clamping structure adjustable between a first open position for allowing the first workpiece to be insert to and removed from the second cavity and a clamping position for retaining the first workpiece in the second cavity.

5. The welding jig of claim 1 wherein the second clamping member includes:
    a clamp defining a second workpiece receiving cavity therein, the clamp movable between an open position for allowing the second workpiece to be insert to and removed from the second workpiece receiving cavity and a clamping position for retaining the second workpiece in the second workpiece receiving cavity.

6. The welding jig of claim 1 further comprising a locking mechanism operatively connected to the second support arm for maintaining the second clamping member at a user desired position.

7. A welding jig, comprising:
    a first support arm extending along a first axis, the first support arm having a passageway therein;
    a second support arm slidably received in the passageway of the first support arm along a second axis generally perpendicular to the first axis;
    a first clamping member operatively connected to the first support arm for supporting a first workpiece along a third axis generally parallel to the second axis;
    a second clamping member operatively connected to the second support arm for supporting a second workpiece, the second clamping member being pivotable about an axis for positioning the second workpiece relatively to the first workpiece at a user selected angle thereto;
    an arm locking structure extending into the passageway of the first support arm for maintaining the second support arm at a user selected position with respect to the first support arm; and
    a moveable adjustment mechanism engageable with the second support arm, wherein movement of the adjustment mechanism by an user is translated to the second support arm so as to move the second support arm along the second axis to the user desired position.

8. The welding jig of claim 7 wherein the first clamping member includes:
    a first clamping structure including first and second clamping elements defining a first cavity therebetween, the first and second clamping elements adjustable between a first open position for allowing the first workpiece to be insert to and removed from the first cavity and a clamping position for retaining the first workpiece in the first cavity.

9. The welding jig of claim 8 wherein the first clamping member includes:
    a second clamping structure including first and second clamping elements defining a second cavity therebetween, the first and second clamping elements of the second clamping structure adjustable between a first open position for allowing the first workpiece to be insert to and removed from the second cavity and a clamping position for retaining the first workpiece in the second cavity.

10. The welding jig of claim 7 wherein the second clamping member includes:
    a clamp defining a second workpiece receiving cavity therein, the clamp movable between an open position for allowing the second workpiece to be insert to and removed from the second workpiece receiving cavity and a clamping position for retaining the second workpiece in the second workpiece receiving cavity.

* * * * *